United States Patent [19]

Sherman

[11] Patent Number: 4,730,412

[45] Date of Patent: Mar. 15, 1988

[54] TAMPER-RESISTANT RODENTICIDE BAIT STATION

[76] Inventor: Daniel A. Sherman, 1355 Bobolink Pl., Los Angeles, Calif. 90069

[21] Appl. No.: 98,564

[22] Filed: Sep. 21, 1987

[51] Int. Cl.⁴ ............................................. A01M 25/00
[52] U.S. Cl. ...................................................... 43/131
[58] Field of Search ............................................ 43/131

[56] References Cited

U.S. PATENT DOCUMENTS

| | | | |
|---|---|---|---|
| 1,325,069 | 12/1919 | Young | 43/131 |
| 4,349,982 | 9/1982 | Sherman | 43/131 |
| 4,541,198 | 9/1985 | Sherman | 43/131 |
| 4,570,377 | 2/1986 | Primavera | 43/131 |
| 4,611,426 | 9/1986 | Willis | 43/131 |

FOREIGN PATENT DOCUMENTS 2517930 6/1983 France .................................. 43/131

*Primary Examiner*—Gene P. Crosby

[57] ABSTRACT

This invention relates to the containment of poisoned baits in a manner that will isolate them from non target species while allowing a user friendly method of reloading the station. Specifically, the device is designed for use in areas accessible to children, pets, and wildlife and, the method of reloading the baiter allows the use of common types of packaging of retail rodenticides, in a manner that affords them with a reasonably protective containment in the aformentioned areas The baiter is designed to allow the introduction of a prepacked rodenticide product on one level of the device and, to allow a rodent access through a totally seperate level. This lateral division of the containment system and the set back of the rodent entry level makes it virtually impossible to reach the stored bait by attempting to compromise the structure of the device with fingers of common objects that might be found around a house hold.

4 Claims, 4 Drawing Figures

TAMPER-RESISTANT RODENTICIDE BAIT STATION

BACKGROUND OF THE INVENTION

Rodenticides have been used throughout the years to bring active rodent populations under control. In todays society the use of these toxins to eradicate rodents has become a serious problem as more and more of the rodent problems appear in areas that are accessible to children, pets and wildlife.

The placement of poisoned baits in these areas represents a real potential for possible harm to children and other non target species that might accidently injest the rodenticides.

In fact, tens of thousands of cases of accidental exposure to rodent baits by children and pets are reported to poison control centers annually.

Since most of the reported cases are due to home owner misuse of the product and, because the baits are sold in cardboard containers, a method was needed that would allow the adaption of these "off the shelf" packages to a level that would afford resonable protection to the baits.

During the past few years several new devices have been introduced to protect poisoned baits. These include the following which have been granted U.S. patents: 43/131 - U.S. Pat. No. 4,132,026 - 1/1979 Dodds, 43/131 - U.S. Pat. No. 4,161,079 -7/1979 - Hill, 43/131 - U.S. Pat. No. 4,281,471 - Jenkins, 43/131 - U.S. Pat. No. 4,349,981 - 9/1981 - Sherman, 43/131 - U.S. Pat. No. 4,031,653 - 6/1977 - Jordan, 43/131 - U.S. Pat. No. 4,349,982 - 9/1982 - Sherman, 43/131 - U.S. Pat. No. 4,400,904 - 8/1983 - Baker, 43/131 -U.S. Pat. No. 4,541,198 - 9/1985 Sherman, 43/131 - U.S. Pat. No. 4,648,201 - Sherman and Foreign Pat. No. 43/131 - 2111022 - 9/1972 Federal Republic of Germany.

Although these devices advanced the state of the art in bait containment, they were all based upon a rodent entering the station at the same level as the bait and depended on baffles or mazes to protect unauthorized access to the rodenticide.

Additional protection was provided by extending the access ports from the bait containment aras through the use of elongated tunnels or baffled tunnel like structures.

And, no facitilty was provided for allowing the introduction of a box of rodenticide into the baiter and confining that box in a manner that afforded protection to the bait in the box after it had been opened.

The present art provides the user with a protective device that will allow the introduction of a preboxed rodenticide and, when the box is opened will afford the user with protective qualities not available until now.

Further, the contruction of the device in two laterla levels allows for the total segregation of the poisoned bait from direct access through the portals and, the rodent bait can only be reached by a small creature such as a mouse moving into the structure and feeding over the set back at the opposing end of the upper level of the device.

Additionally, the instant invention provides for a quick and secure method of loading the box of bait into the baiter through the use of a trap door located at the rear of the structure. This insures that when the baiter is mounted to a surface, the baiter can only be refilled by deliberately removing it from the surface.

Further, the baiters lower level contains a sloped floor that cooperates with the box, forcing the bait forward and insuring that the supply of bait will always be within easy reach of the target rodent.

This invention teaches the art of containg bait in a manner that isolates it from tampering by the use of multi tiered construction. The scope of the teachings are not limited by the drawings alone and, other novel and unique features are demonstrated by the disclosure of the drawings and the subsequent descriptions.

DETAILED DESCRIPTION OF THE DRAWINGS

Figure 1:
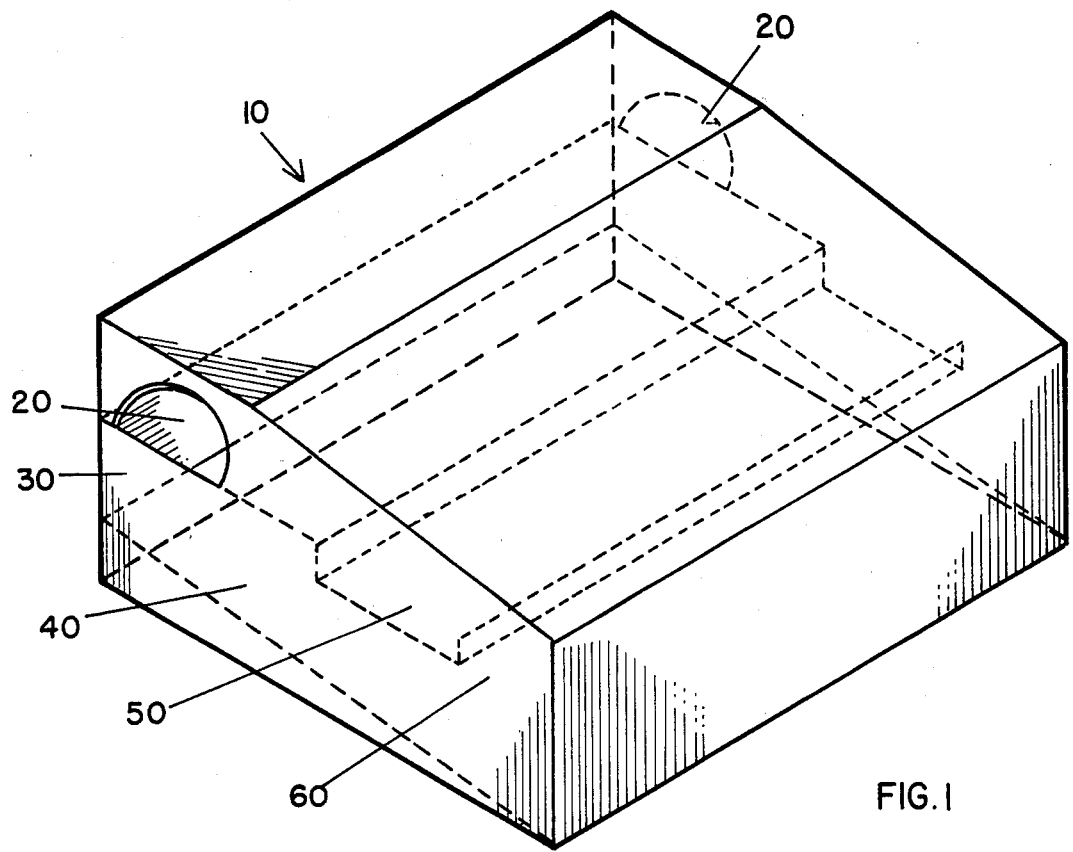
FIG. 1 depicts the entire structure of the tamper-resistant bait station showing the relationships between the internal construction, the entrance portals and the two levels that seperate the bait compartment from the rodent tranversing area. The sloped floor is depicted, without a bait box present and the set back of the top level is clearly demonstrated. When the unit is contructed of a translucent material, this set back allows the user to view the content of the bait station without the need to open the unit.

As can be seen in FIG. 1 the tamper-resistant rodenticide bait station is depicted generally as 10, a geometrically shaped box with two entrance/egress portals 20 at opposing ends of the box. The portals 20 are located so that a rodent entering the box does so on an upper internal platform 50 and so that anyone pocking into the box 10 would only come into contact with the upper internal platform 50. The platform 50 extends towards the front of the baiter and is short of the rear wall by a set back 60. The lower platform 40 is tilted at and angle that is higher from the rear of the box then at the front of the box. This angle on the lower platofrm 40 is designed to force bait towrds the front of the baiter and to the furthest point away from the portals 20. The rear wall 30 is depicted in relationship to the structure.

Figure 2:
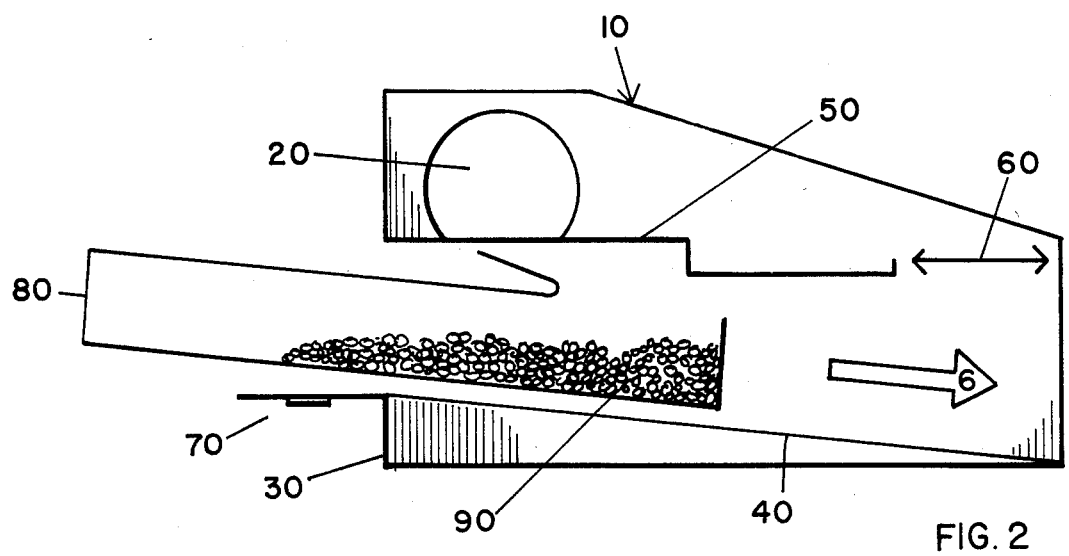
FIG. 2 is a side view showing the relationship between the two levels and the entrance holes. Depicted in this drawing is an independent box of rodent bait being placed through the access door located at the rear of the device. The drawing depicts the angle that the box is forced to take as it enters the baiter and is moved forward to the interior of the unit.

In FIG. 2 we see and indpendent box of rodenticide 80 being pressed forward in the direction 6 and sliding down thelower platform 40. As the bait 90 contained in the independent box 80 is tilted we can see that it starts to move towards the front of the box. Depicted is the upper platform 50 which acts to shield the bait during the insertion process and until the bait is totally forward of the platform 50. The upper platform 50 is also providing a barrier between the portals 20 and the open bait box 80. Depicted in this drawing is a side perspective of the rear wall 30 showing the access door 70 in the open position that allows the insertion of the independent box 80.

Figure 3:
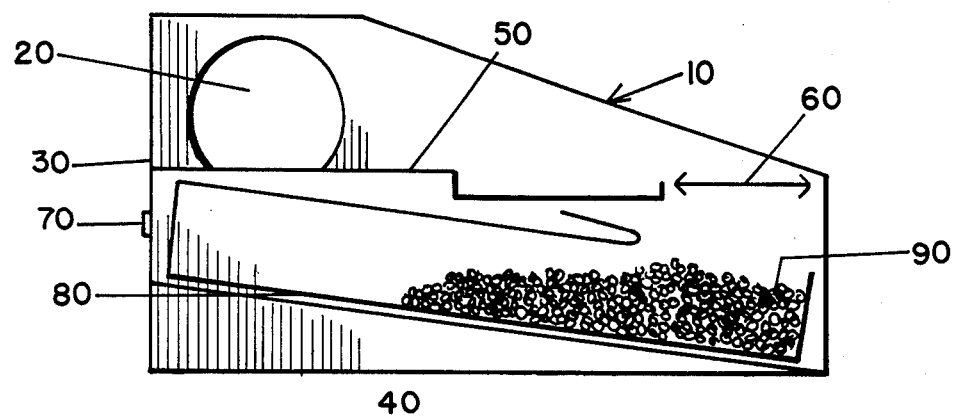
FIG. 3 is an additional side view showing the independent box of rodent bait in place and the rear door snapped shut. The open portion of the independent box of bait is now alligned with the set back on the top level providing a trough type effect in which the rodent, feeding from the top level, can reach down and consume the exposed bait. Also depicted is the bait, which has moved forward in the independent tray as it reaches the maximum angles at the front of the lower level and how, when the bait is in the most forward position it lines up with the set back on the top level.

FIG. 3 shows the baiter 10 in the fully loaded position with the independent box of rodenticide 80 moved fully forward and in place. The open portion of the box 80 is now alligned with the set back on the upper level exposing the bait 90 to a rodent raversing the upper platform 50. We can see that the set back 60 is at the furthest point from the portals 20, inhibiting prying and contact with the bait 90. The access door 70 located on the rear wall 30 has been snapped into place to complete the seal of the box 10. When the baiter 10 is constructed of a translucent or clear material the set back 60 allows the user to visually check the level of bait 90 without the need to remove the independent bait box 80.

Figure 4:
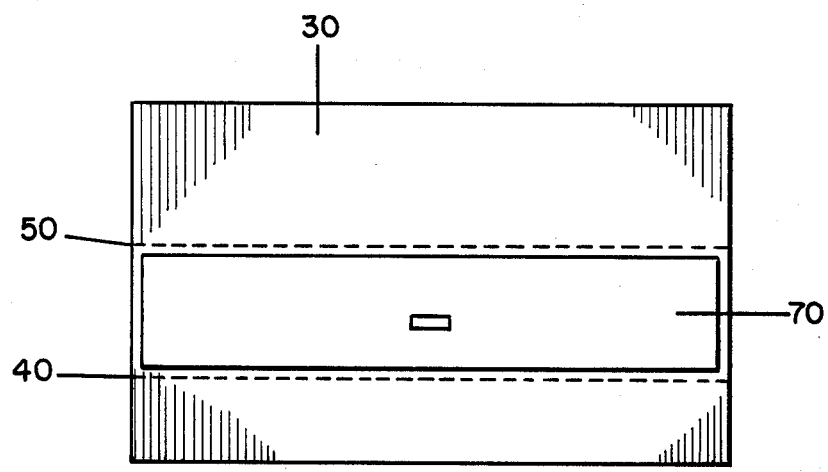
FIG. 4 depicts the rear panel of the baiter and show the relationship between the top level, the access door, and the lower level.

FIG. 4 represents a detail of the rear wall 30 showing the position of the access door 70 between the upper platform 50 and the lower platform 40. This clearly demonstrates the isolation of the chamber forned bewteen the upper platform 50 and the lower platform 40.

What I claim is:

1. A tamper-resistant rodent bait station having two lateral internal levels; said bait station having two portals for rodents to enter and exit at opposing ends; a top level being flush with said portals; a bottom level forming a compartment in cooperation with said top level for the storage and dispensing of rodenticide bait; said top level being set back from the front wall of said bait station forming a trough for a rodent traversing said top level to reach the bait stored in said compartment; said portals being positioned at the opposing end of the bait station from said trough.

2. A tamper resistant rodent bait staton as in claim 1 having an access door at its rear to allow the introduction of rodenticide bait without the removal of any section of the bait station.

3. A tamper resistant rodent bait station as in claim 2 whos bottom level is sloped downward to direct the collection of bait to the furthest point opposing its entrance portals.

4. A tamper resistant rodent bait station as in claim 3 constructed of a translucent material that allows the user to view the remaining bait from the exterior without removal of any part of the bait station.

* * * * *